Mar. 6, 1923.
J. NORRIS
COMBINED JACK AND TIRE TOOL
Filed Nov. 15, 1920
1,447,625
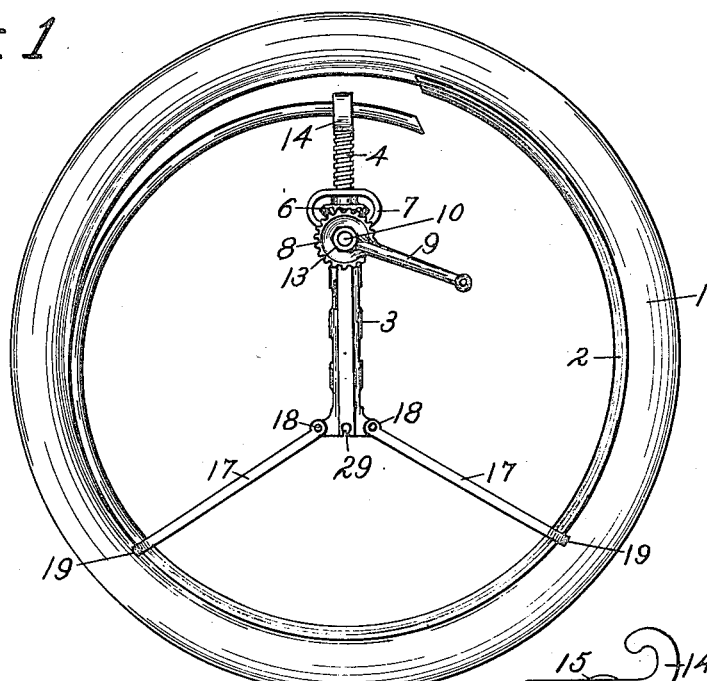
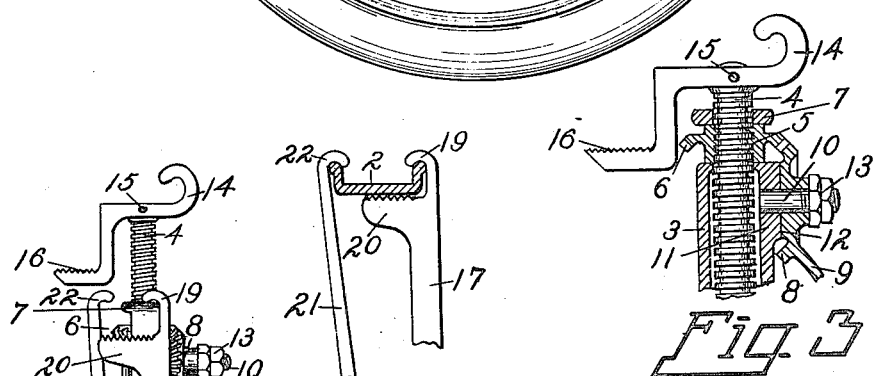
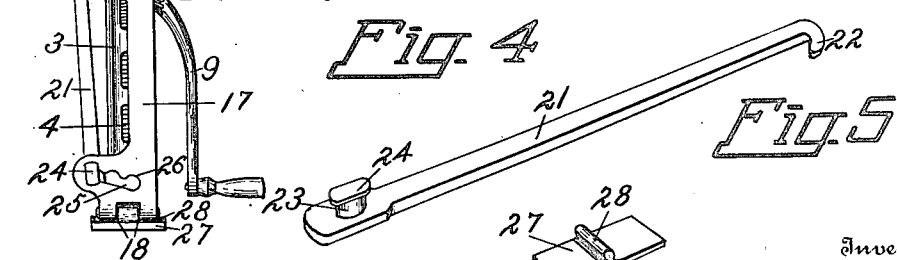
Inventor
Jack Norris
By Herbert E. Smith
Attorney Patented Mar. 6, 1923.

1,447,625

UNITED STATES PATENT OFFICE.

JACK NORRIS, OF SPOKANE, WASHINGTON, ASSIGNOR TO UNITED SPECIALTY CO., OF SPOKANE, WASHINGTON, A CORPORATION.

COMBINED JACK AND TIRE TOOL.

Application filed November 15, 1920. Serial No. 424,087.

*To all whom it may concern:*

Be it known that I, JACK NORRIS, a citizen of the United States, residing at Spokane, in Spokane County, State of Washington, have invented certain new and useful Improvements in Combined Jacks and Tire Tools, of which the following is a specification.

My present invention relates to improvements in a combined jack and tire tool designed especially for use as an automobile auxiliary or accessory, first as a jack for lifting the axle and wheels from the ground, and after the axle is blocked up, the tool forms a convenient and facile instrument for contracting and restoring a split wheel rim in the process of demounting and replacing a wheel tire.

With the above ends in view the invention consists in a well known type of jack or screw bar having combined therewith a dispensible base or supporting block; in the combination with the jack of foldable anchoring arms rendering the device readily adaptable for use with various forms of split rims; in the specially designed mounting of the driving pinion of the screw jack; and in other details of construction and novel arrangements of parts as will be hereinafter more fully pointed out and claimed.

In the accompanying drawings I have illustrated one complete example of the physical embodiment of my invention in which the parts are combined and arranged according to the best mode I have thus far devised for the practical application of the principles of my invention.

Figure 1 is a view in side elevation showing the tool applied to a split rim, with the rim contracted in order that the tire may be dismounted.

Figure 2 is a side elevation of the tool, with the laterally and forwardly swinging arms folded.

Figure 3 is an enlarged, detail, vertical sectional view at the top of the jack showing the screw feed device and combined draw hook for the tire tool and step for the jack.

Figure 4 is a fragmentary, detail view showing the outer ends of the laterally swinging and forwardly swinging arms hooked to a rim requiring the use of the two hooked arms when contracting the rim.

Figure 5 is a detail perspective view of one of the forwardly swinging arms.

Figure 6 is a detail perspective view of the detachable base plate for the jack.

In order to give a clear understanding of the utility of the tool I have illustrated in Figure 1 a well known type of tire 1 and split rim 2, the latter adapted to be contracted for demounting the tire, and replaced in normal position after the tire has been mounted on the wheel.

The tool involves the use of a jack of the well known screw feed, and comprises a pedestal or hollow standard 3 in which the screw bar 4 may be raised or lowered, a rotatable nut 5 with teeth 6 to form a driven pinion being retained at the top of the standard within the housing or yoke 7 formed integral with and located above the top of the standard. The nut and pinion are revolvable but are retained in position between the top of the standard and the yoke 7. The nut is revolved through the instrumentality of a complementary bevel gear or driving pinion 8 which meshes with the integral teeth on the nut, and the driving gear is turned by means of the integral crank handle 9. The driving gear is journaled on a horizontally disposed stud shaft or gudgeon 10 fixed in the hollow standard near the top, a strengthening boss 11 being fashioned on the standard for the purpose, and the smooth broad face 12 of the gear 8 is held against the smooth face of the boss by the locking nuts 13 on the threaded end of the stud shaft or gudgeon 10. The broad bearing face or surface between the driving gear and the boss insures a stable rotation of the driving gear and prevents it from wabbling, and the rigidly retained driving gear insures a close meshing at all times between the driving gear and driven gear, thus preventing slippage between the teeth of the gears, which frequently results in devices of this type. Wear may be taken up between the driving gear and boss by tightening the lock nuts sufficiently to permit rotation of the gear and to insure a stable movement of the gear.

At the free end of the screw bar, beyond the yoke, a hook 14 is provided and secured to the bar by a transverse pin 15, the hook also being fashioned with an extension or angular step 16, the latter for use when the device is used as a lifting jack. The hook 14 is designed to fit over the flanged edge of a rim, as in Figures 1 and 4, when the tool is utilized to contract the split rim, and when in position the tool is anchored to the rim by the laterally swinging and foldable arms 17 17, which are pivoted to the bottom or lower end of the pedestal or standard at 18. The free ends of these arms are fashioned as hooks 19 to engage over the flanged edge of the rim 2 at equidistant points from the body of the tool, and support or anchor the tool in rigid position for use in contracting the split rim, as in Figure 1, and the hooks have corrugated or toothed lugs 20 to fit beneath the rim for outward pressure on the rim when the latter is being displaced. On some forms of rims the single hooks 19 on the anchoring arms 17 will be sufficient for the purpose, but on other forms of rims, as in Figure 4, an additional arm is utilized in conjunction with each arm 17 to engage the opposite flanged edge of the rim. For this purpose I utilize a pair of forwardly swinging or folding arms 21, 21 each provided with an end hook 22, and these arms are pivoted or hinged to the anchoring arms 17 by means of a key 23, having a retaining head 24, to fit in the slots 25 of the anchoring arms, the slots being notched or recessed as at 26 for adjusting the pivotal point of the keys. These arms 21 swing bodily with the arms 17 and in addition have a swinging movement relative to the arms 17 so that they may be engaged over the opposite flanged edge of the rim as in Figure 4.

When using the device as a jack I employ a base plate 27 that is fashioned with an integral tenon or tongue 28 to slide into and be retained in the key-hole groove 29 in the base of the standard. When slid into this position the base plate forms a broad supporting foundation for the jack and may readily be removed when the tool is being used for contracting the rim as in Figure 1.

Having thus fully described my invention, what I claim and desire to secure by Letters Patent is—

1. The combination in a tool as described with a hollow standard, a non-rotatable screw bar and feed device, and a hook on the bar, of a pair of laterally foldable, hooked anchoring bars hinged to the standard, and a complementary pair of forwardly swinging hooked bars pivoted on said anchoring bars, for the purpose described.

2. The combination in a tool as described with a standard, a reciprocable member and a feed device therefor, of a hook on said member, a pair of laterally foldable, hooked anchoring arms pivoted to the standard, said anchoring arms having notched slots adjacent their pivoted ends, and a pair of complementary forwardly swinging hooked arms each having a key pivotally engaged in a slotted anchoring arm.

3. The combination in a tool as described with a standard, a reciprocable member and a feed device therefor, said standard having a key-hole slot in its lower end, and a separable base plate having a tenon adapted to be retained in said slot.

In testimony whereof I affix my signature.

JACK NORRIS.